July 23, 1929.  R. L. PRITCHARD  1,722,110
APPARATUS FOR SEPARATING FIBERS FROM BAST
PLANTS AND OTHER ADHERING FIBERS
Filed Sept. 21, 1928  10 Sheets-Sheet 1

Inventor
Reuben Levi Pritchard
by
Mocle + Blum
Attorneys

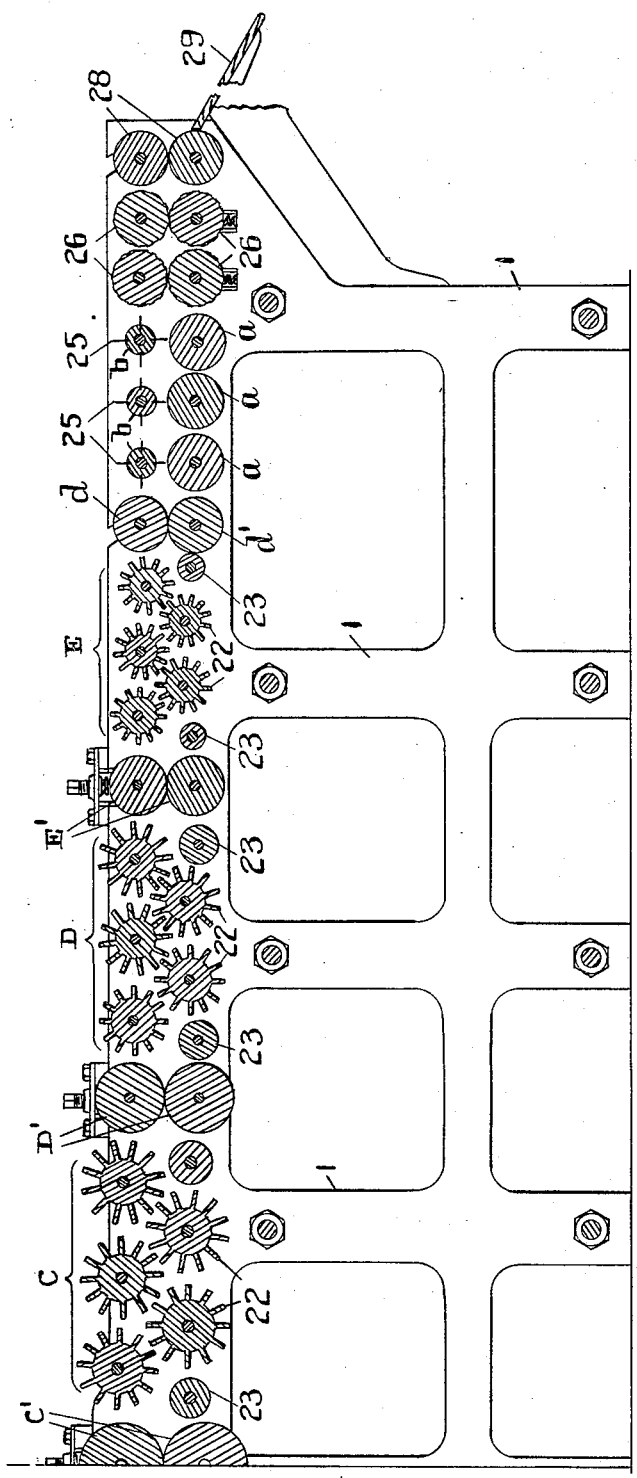

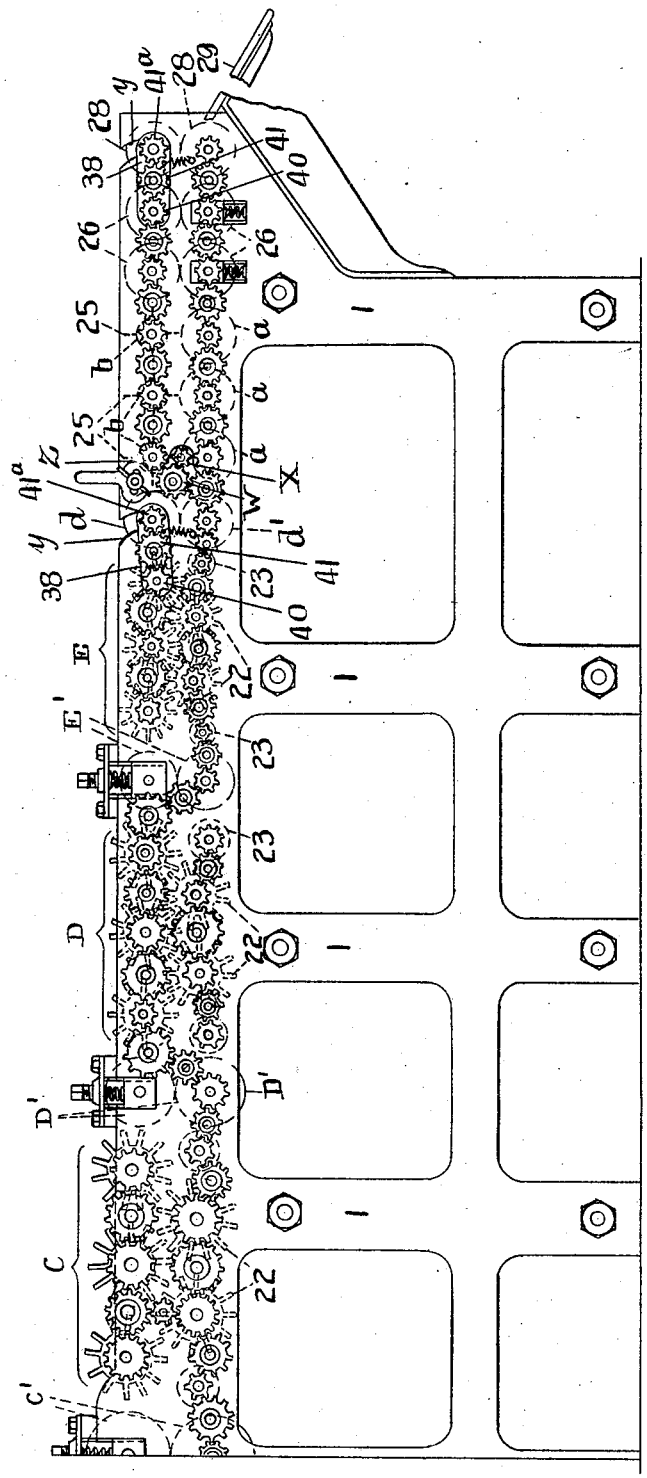

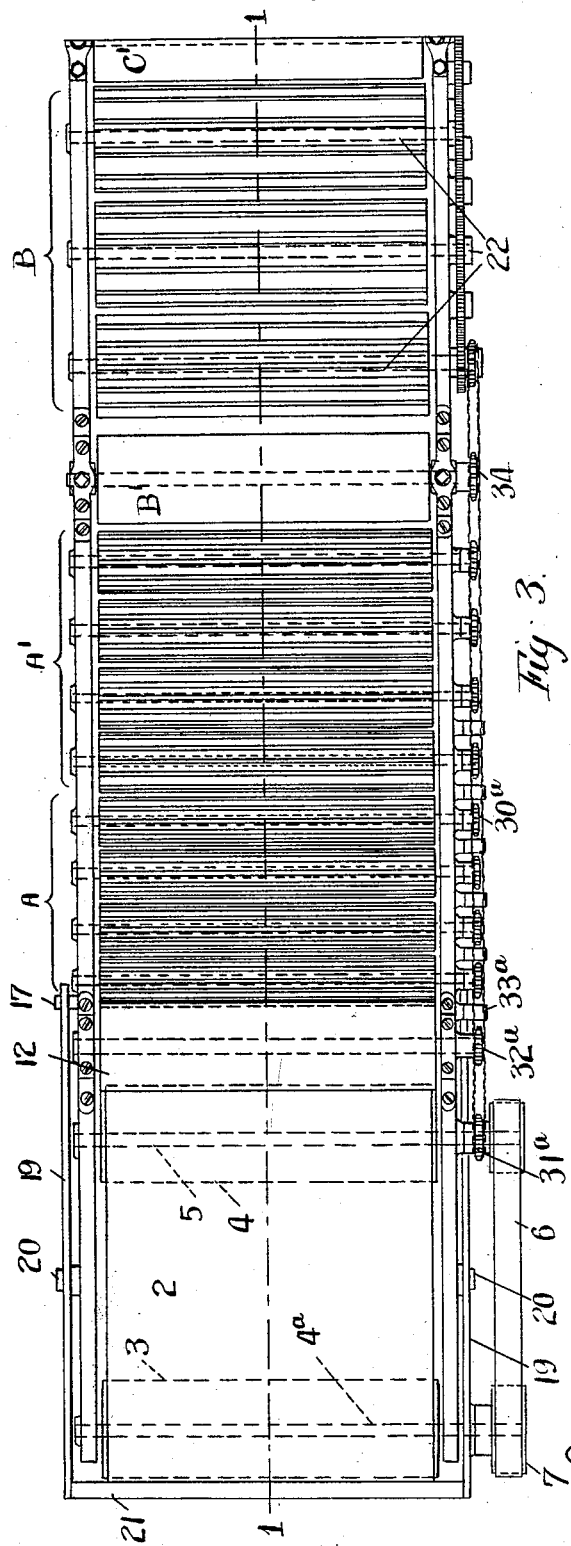

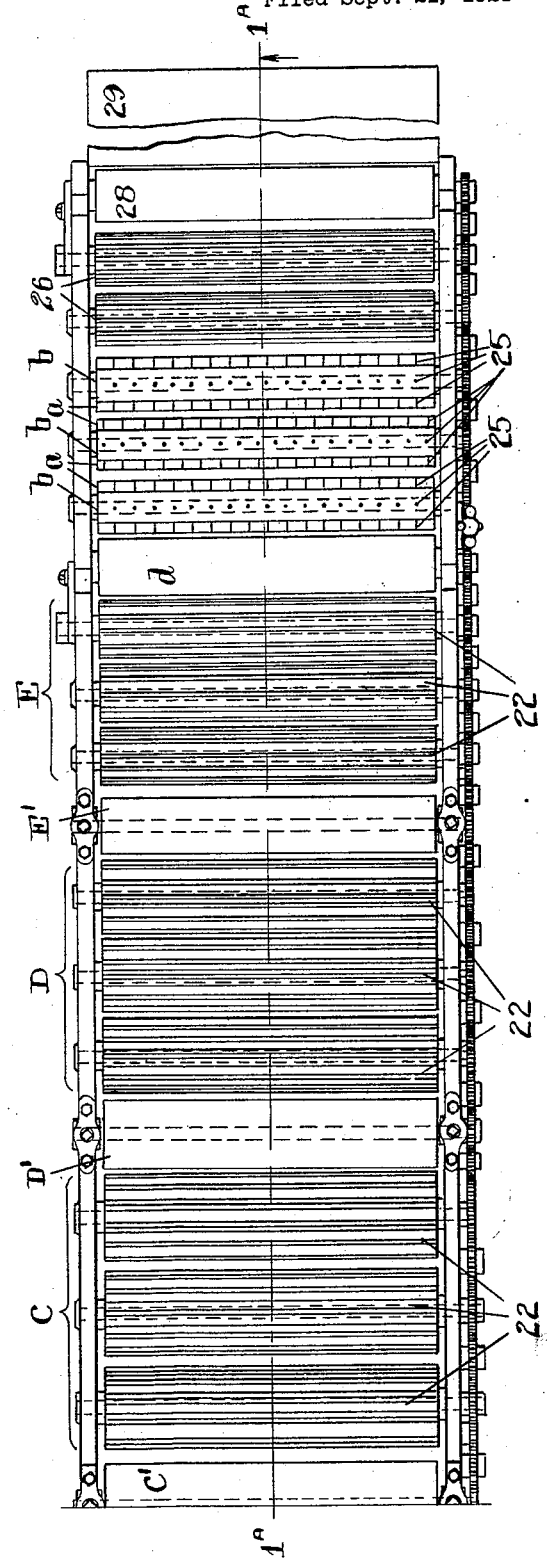

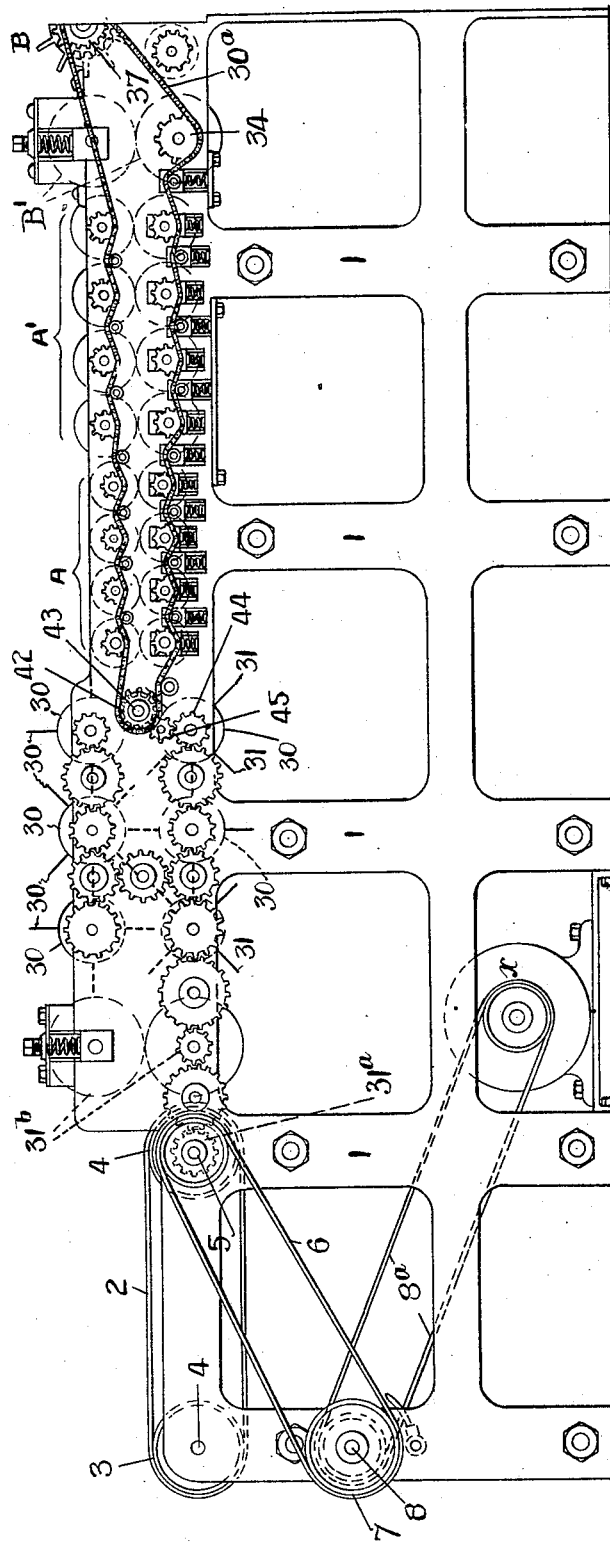

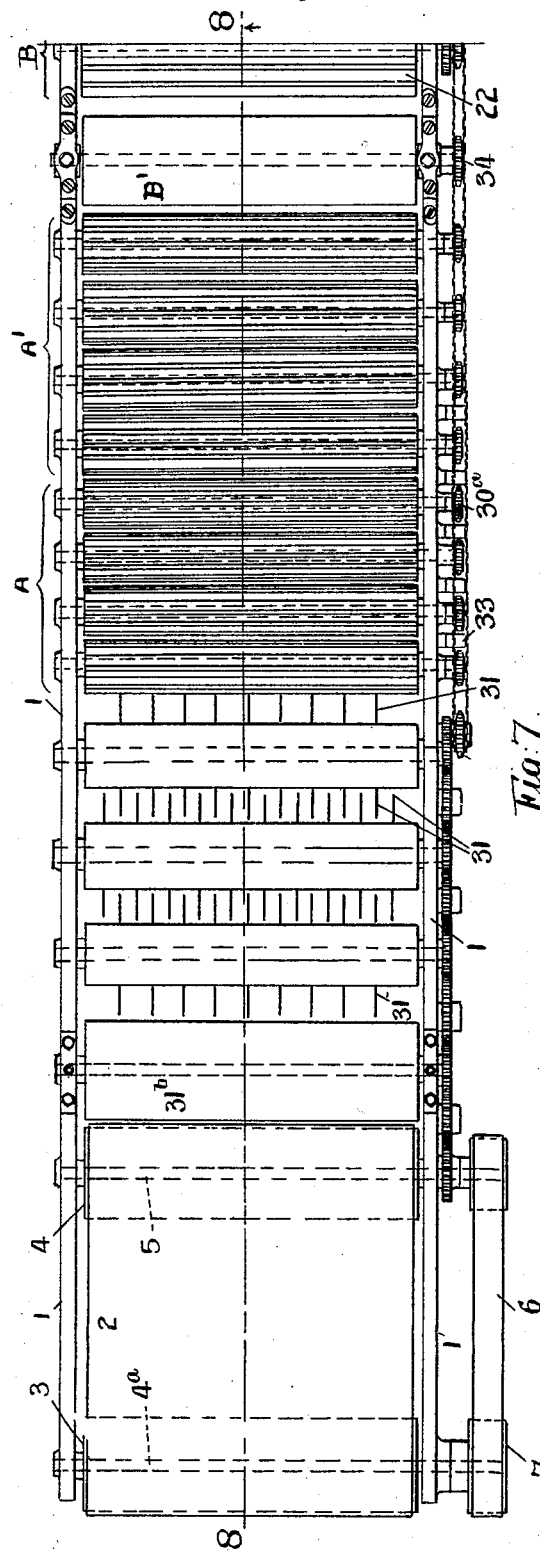

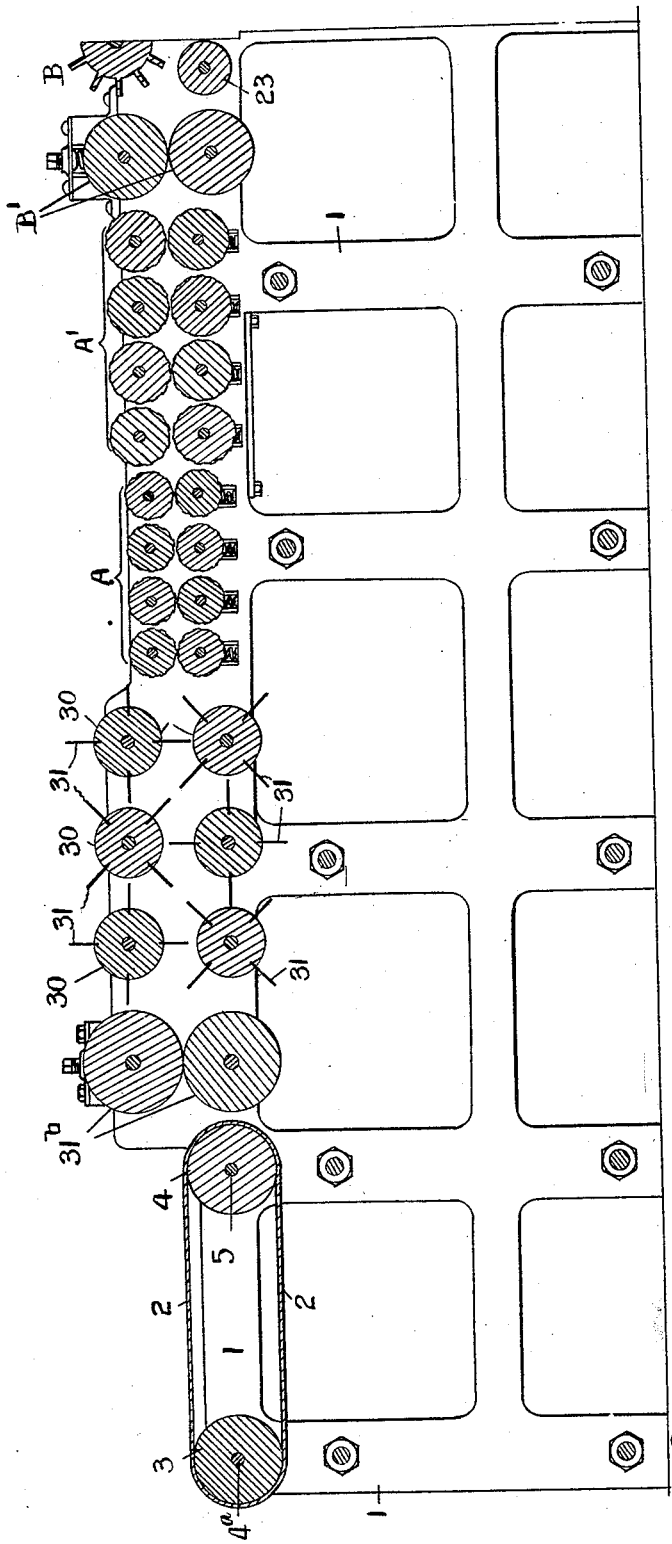

Patented July 23, 1929.

1,722,110

UNITED STATES PATENT OFFICE.

REUBEN LEVI PRITCHARD, OF HAMPSTEAD, LONDON, ENGLAND.

APPARATUS FOR SEPARATING FIBERS FROM BAST PLANTS AND OTHER ADHERING FIBERS.

Application filed September 21, 1928, Serial No. 307,473, and in Great Britain January 4, 1928.

This invention relates to machines for separating fibers of bast plants and other adhering fibers, and it relates to machines of the kind embodying the process according to British Letters Patent No. 105,094, and U. S. Patent No. 1,315,328.

The present invention has for its object certain improvements designed primarily to secure the more efficient operation of the machine and to enable it to deal effectively with short lengths of material. The invention further provides improved means for securing the alignment of the flax, straw or other material, and for securing the more effective removal of the seeds before the separation of the fibers is effected and for removing woody portions of the plants present in the material after the separation of the fibers is effected.

According to the invention forming the subject of the aforementioned patent the material is treated for the separation of the fibers by passing it through zones formed of pairs of rollers having intermeshing ribs or teeth of rectangular cross-sectional outline, the arrangement being such that the material is held tense during its passage through the zone and is subjected to a sharp bending action in opposite directions of the line of travel of the material, the material whilst subjected to the action of the rollers being unconfined, that is to say, not compressed against the sides of the teeth of the rollers or against the crown of the teeth and the bottom of the flute between the teeth.

In order that this invention may be the better understood drawings are appended showing a machine embodying the present improvements as applied to the treatment of flax, both in a threshed condition and in a condition with the seeds thereon.

In the accompanying drawings:—

Fig. 1 is a longitudinal section on line 1—1 Fig. 3 of the left hand portion of the apparatus.

Fig. 1ª is a longitudinal section on line 1ª—1ª of Fig. 3ª of the right hand portion of the apparatus.

Fig. 2 is a side elevation of the left hand portion of the apparatus.

Fig. 2ª is a side elevation of the right hand portion of the apparatus.

Fig. 3 is a plan of the portion of the apparatus shown in Fig. 2.

Fig. 3ª is a plan of that portion of the apparatus shown in Fig. 2ª.

Fig. 6 is a side elevation of part of the apparatus showing certain modifications.

Fig. 7 is a plan.

Fig. 8 is a longitudinal section on line 8—8 Fig. 7.

Referring to the appended drawings, 1 indicates generally the frame of the apparatus.

Figure 4:
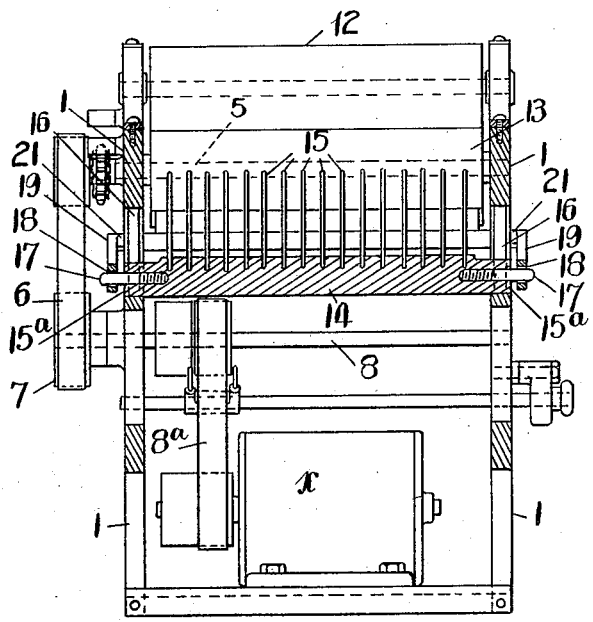
Fig. 4 is a section on line 4—4 Fig. 2.

Arranged at one end of the machine is an endless band or belt 2 supported by rollers 3, 4 mounted upon spindles 4ª, 5. The spindle 5 is driven by the belt 6, passing over a pulley 7 mounted upon the main shaft 8 of the machine, to which shaft 8 motion is imparted by means of a belt 8ª driven from an electric motor or other source of power indicated by $x$. The shaft 8 is provided with fast and loose pulleys, indicated respectively by 8ª and 8ᵇ in Fig. 4, and a belt shifter is provided whereby the belt may be moved to the fast or loose pulley at the option of the operator. The belt 2 is maintained stationary whilst the material, which is received in bundles, is spread out thereon with the root ends forward and the stalks aligned ready for passage into the machine. Disposed at the inner end of the belt 2 and arranged transversely to the line of motion of the stalks are a pair of smooth rollers of which the upper, indicated by 12, is of greater diameter than the lower 13, which latter is positively driven and is mounted in fixed bearings, whilst the upper is so mounted that it is free to move in the vertical plane and is driven by its frictional contact with the lower roller or by the material as it passes between the two rollers. The weight of the upper roller is such that this roller breaks some of the seed bolls and, the seeds thus loosened fall down on each side of said lower roller.

Located transversely to the line of travel of the material is a horizontally disposed bar 14 having upon its upper surface pins 15, the upper ends of which are pointed but are sufficiently blunt to permit them to pass between the stalks without piercing or otherwise injuring said stalks. The ends of the bar are carried by blocks or slides 15ª moving in guides 16 upon the frame 1, the ends of said blocks being provided with pins 17 engaging slots 18 in the inner ends of the levers 19 mounted upon pins 20. The levers extend rearwardly of the apparatus and are connected at their outer ends by a rod or bar 21 disposed conveniently for ready manipulation by the operator at the feeding end of the apparatus. Normally the bar occupies the position shown, with the upper ends of the pins 15 level, or approximately level, with the centre of the lower roller. The purpose of the pins, as will be hereafter more fully explained, is to remove the seeds which have not been loosened by the weight of the larger upper roller 12.

Arranged immediately in front of the bar just referred to are pairs of rollers arranged in groups indicated by A A¹.

In the present instance two groups are shown, each group comprising four pairs of finely and longitudinally fluted compressing rollers, of which the upper are mounted in fixed bearings, and the lower mounted in resiliently supported bearings.

The number of rollers in the group and also the number of the groups themselves may be varied as may be desired according to the thickness of the woody substance around which the fibers grow. Where more than one group of the compressing rollers are employed it is necessary that there should be a slight difference in the carrying speed of the successive groups, which may be effected by suitably varying the speed of the said rollers of the various groups, those of each succeeding group being of larger diameter than those of the preceding group. The ribs and flutes of the larger diameter rollers are also wider and the depth to which the said ribs enter the flutes is also greater.

The rollers just described serve a dual purpose in that they draw the branch ends and stalks between the pins 15 and compress and knead the woody particles of the stalk, softening and splintering it.

These compression rollers in the zones A, A', may be smooth or finely fluted. While I prefer to use a plurality of zones of such compression rollers, my invention is not limited to the use of a plurality of such zones.

The bar 14 is operated to bring the pins into their effective position when the root ends of the material are grasped by the third pair of pressing rollers.

Figure 1:
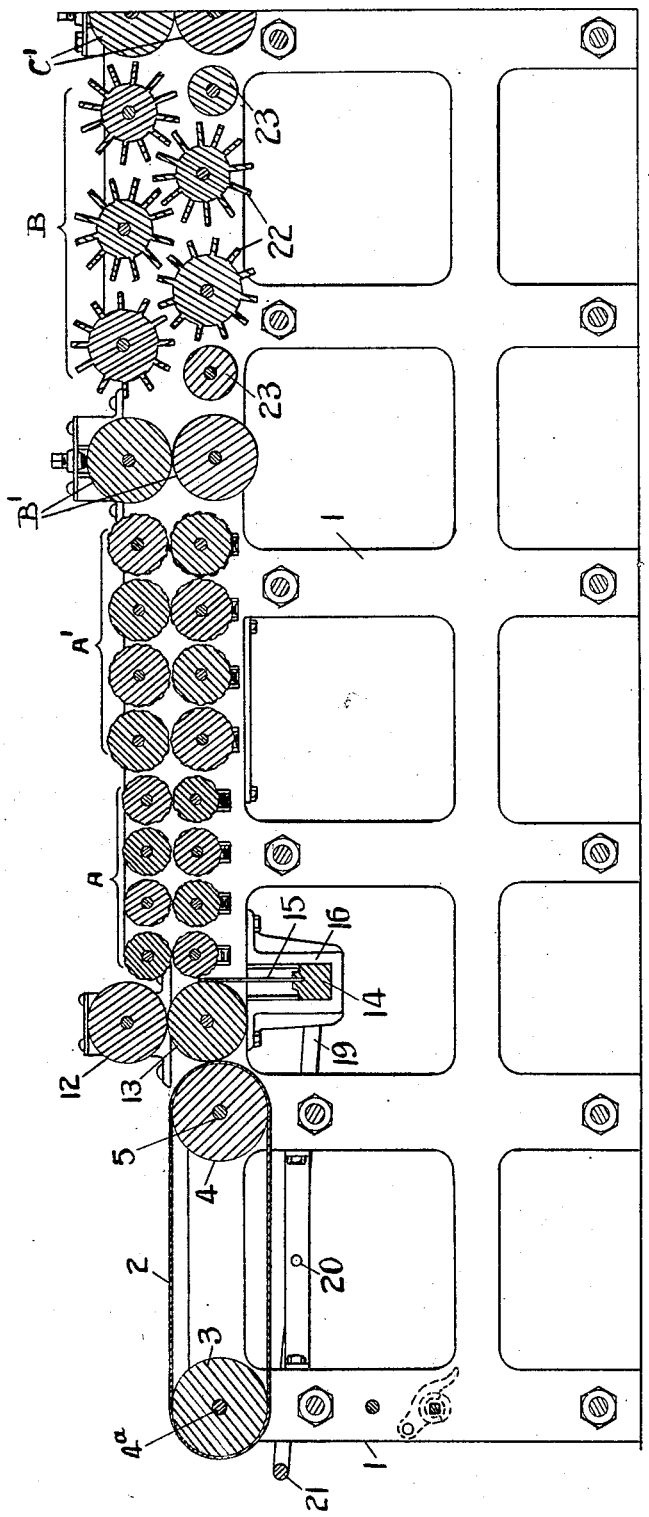

Succeeding the groups of finely fluted rollers are several distinct zones each including a pair of smooth rollers of which the upper is resiliently mounted, the lower being mounted in fixed bearings and being positively driven and bending rollers 22, said rollers 22 having ribs and channels like the rollers of the aforementioned Letters Patent No. 105,094. The smooth rollers B', C', D' and E' which precede each zone of bending rollers may be finely fluted without departing from my invention, and for convenience, said rollers may be designated as "preceding" rollers. There are several groups or zones of these bending rollers, each roller being supported in fixed bearings. In the present instance four zones only are shown, indicated respectively by B, C, D and E, the zones B, C, D and E, being preceded by a pair of smooth rollers B¹, C¹, D¹, E¹, respectively. The bending rollers of the zones just referred to are arranged in staggered formation, as shown in the drawings in Figs. 1 and 2 and in the arrangement illustrated five rollers are in staggered formation, three being disposed above the line of travel of the material and two below. These rollers are so arranged that the ribs of the first and last upper rollers enter the channels of the contiguous lower rollers only, whereas the middle upper roller meshes with both the lower rollers.

As shown in the drawings, the axis of the second bending roller 22 in each zone is above the axis of the preceding bending roller in the same zone or series. Hence the ribs of the succeeding lower deeply fluted bending roller in each zone enter the flutes of the two co-acting upper rollers to a depth greater than the depth to which the ribs of the preceding lower bending roller enters the flutes of the upper bending rollers co-acting therewith. The number of rollers in the zones may be increased but the arrangement will in all cases be the same, that is to say, the inner upper roller or rollers as the case may be will each mesh with two of the lower rollers.

Disposed respectively in front of and behind the first and last lower channelled rollers are other rollers 23, of smaller diameter than the channeled rollers, the rollers 23 being positively driven, their purpose being to act as carriers whereby the material is prevented from falling away or sagging, so that it is compelled to follow the desired course. These rollers 23 may be designated as "carrying" rollers.

The diameter of the rollers 23 being less than that of the channelled rollers their speed of revolution is proportionately quicker than that of the channelled rollers.

The carrying capacity or peripheral speed of every channelled roller in every zone is the same, but the carrying capacity or peripheral speed of each pair of smooth rollers preceding each zone is reduced by some five per cent to 10 per cent with respect to that of the channelled rollers of the zone behind them. The reduction in the carrying speed or peripheral speed of the smooth rollers enables the corrugations previously produced by the action of the preceding channelled rollers thereon to be drawn out by the greater take up of the succeeding channelled rollers.

The number of zones comprising these channelled rollers may be varied as desired but is primarily controlled by the fineness of the separation it is desired to secure. In practice four to eight zones will usually be found to give satisfactory results.

The diameter of the channelled rollers may be reduced at certain points, a proportional increase in peripheral speed being necessary to secure the desired uniformity in the carrying speed of the rollers. By decreasing the diameter of the channeled rollers and increasing the speed of rotation as just above referred to it is possible to increase the number of bends without, as aforesaid, increasing the carrying speed of the said rollers.

The material after the treatment just referred to requires to be freed from the particles of the woody matter to which it is still adhering and which is entangled between the fibers.

This removal of the woody material is effected by subjecting it to the action of a zone comprising one or more pairs of smooth rollers of which the upper $d$ is spring pressed and the lower $d^1$ mounted in rigid bearings, following which are pairs of rollers comprising a lower smooth roller $a$ and an upper roller $b$ having longitudinal rows of short radially projecting pins 25 of small effective diameter thereon. These rollers $d$, $d'$ may be designated as "additional compression" rollers. The pins on the rotation of the rollers to which they are attached pass clear of the surface of the smooth rollers $a$. The upper and lower rollers rotate in fixed bearings, the pins upon one roller $b$ being so arranged that they pass between the pins of the adjacent roller. Normally the direction of motion of the rollers $a$ and $b$ is such as to feed the material forward.

After leaving the pin rollers just referred to the material passes to one or more pairs of finely fluted rollers 26. The upper roller of each pair is supported in fixed bearings whilst the lower is resiliently mounted. The diameter of these rollers and their carrying speed are equal to those of the last channelled rollers.

These rollers 26 may be designated as "final feed" rollers. It is to be understood that smooth rollers and finely fluted rollers are equivalents, whenever either of these types of rollers is specified herein. Likewise, whenever one of a pair of rollers is mounted in a resilient bearing to be pressed against the other roller of said pair, the position of the resilient bearing may be reversed without departing from my invention.

Figure 5:
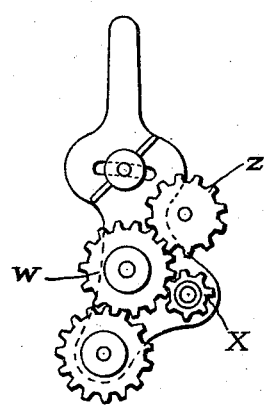
Fig. 5 is a view showing certain details.

As soon as the fibers are firmly held by the fluted rollers 26 the direction of rotation of the pin rollers is reversed so that the pins move in a direction opposite to the direction of motion of the material, and thus exert a combing action thereon under which the woody particles before referred to are removed. The reversal of movement of the rollers is under the control of an operator and may be effected in any suitable manner, for example, the said rollers may be driven through a reversing gear such as that shown in Fig. 5, and by means of which either the pinion $w$ or $x$ may be caused to engage the pinion $z$ on the spindle of the first upper pinned roller $b$.

The rollers 26 act to draw the material forward against the action of the pin rollers, whilst the said pin rollers are running in a direction such that the pins engaging the material move in a direction opposed to that of the material.

The number of pin rollers may be varied as desired and it may under some circumstances be considered advisable to provide the lower rollers $a$ with pins such as above described, in which case provision would be made for reversing the direction of motion of both the upper and lower rollers.

The material finally passes between a pair of smooth rollers 28 of which the upper is spring pressed and the material is discharged into a chute 29.

Throughout the foregoing description it has been assumed that the flax is in bundles and unthreshed. Where, however, it is desired to deal with the flax after it has been threshed it is necessary for the efficient working of the machine that the stalks be brought more or less into alignment. Moreover as the seeds have been removed it is unnecessary to treat the stalks for this purpose.

Under these circumstances in place of the horizontal bar 14 for removing the seeds other mechanism would be provided, adapted to effect the alignment of the material.

Mechanism such as that referred to comprises a number of pairs of rigidly mounted positively driven rollers, such as 30, said rollers having radially projecting suitably spaced pins 31 arranged upon lines running parallel with the axial line of the roller, the lines being arranged at 90° apart. The pins of one roller are interspaced with regard to the pins of the other roller.

Each pair of rollers 30 runs at a higher speed than the preceding pair. These rollers 30 may be designated as "pin alignment rollers".

The pins 31 are provided with dull points whereby they may readily pass between the stalks without injury thereto. The direction of motion of the rollers is such that the pins when in operation move in the same direction as that of the material. The increased speed of the pins acts to drag the material between the pins of the preceding roller and thus secure its parallelism and alignment parallel to its line of travel.

Moreover any seed bolls that may remain upon the plants are torn off by the more rapidly moving pins and are subsequently removed by the heavy roller 12, which is located behind the finely fluted compressing rollers, the apparatus otherwise remaining as already described.

Preceding the pin rollers are a pair of smooth rollers 31$^b$, of which the upper is spring pressed.

When dealing with the material in the threshed condition the feed belt may be continuously moving.

It will be understood that various changes may be made both as regards the number of rollers that may be employed in any particular group and the number of groups also the fineness of the channels, where such are employed, or instead of channeled or roughened rollers smooth rollers may be employed, providing the desired action may be secured thereby.

In the drawings means for driving the various rollers are illustrated. It is obvious, however, that this may be varied as desired.

In the present instance motion is transmitted to the rollers 13 and those forming the groups or zones A A$^1$ by means of a chain 30$^a$ engaging a sprocket or chain wheel 31$^a$ upon shaft 5, said chain also engaging a chain wheel 32$^a$ upon the spindle of the roller 13. The chain passes over idler or jockey pulleys 33$^a$ and engages other chain wheels upon the spindles of the rollers of the zones A A$^1$. The chain also actuates the lowermost of the pair of rollers B$^1$, for which purpose there is provided upon the spindle of the said roller a chain wheel 34.

The chain 30$^a$ also actuates the channelled rollers by engaging a sprocket wheel 37 upon the spindle of the first upper channelled roller from which motion is transmitted to the remaining rollers of the apparatus through a suitable train of gearing, of which further detailed description is considered unnecessary.

The roller $d$ and the upper roller 28 are resiliently mounted by providing pairs of spring actuated arms 38 pivotally mounted upon the spindles of the upper channelled roller 22 at the forward end of the zone E and the upper forward finely fluted roller 26 respectively, the free ends of the arms carrying the spindles of the said rollers $d$ and 28, the frame being suitably slotted at $y$ to permit the vertical movement of the said spindles.

Figure 2:
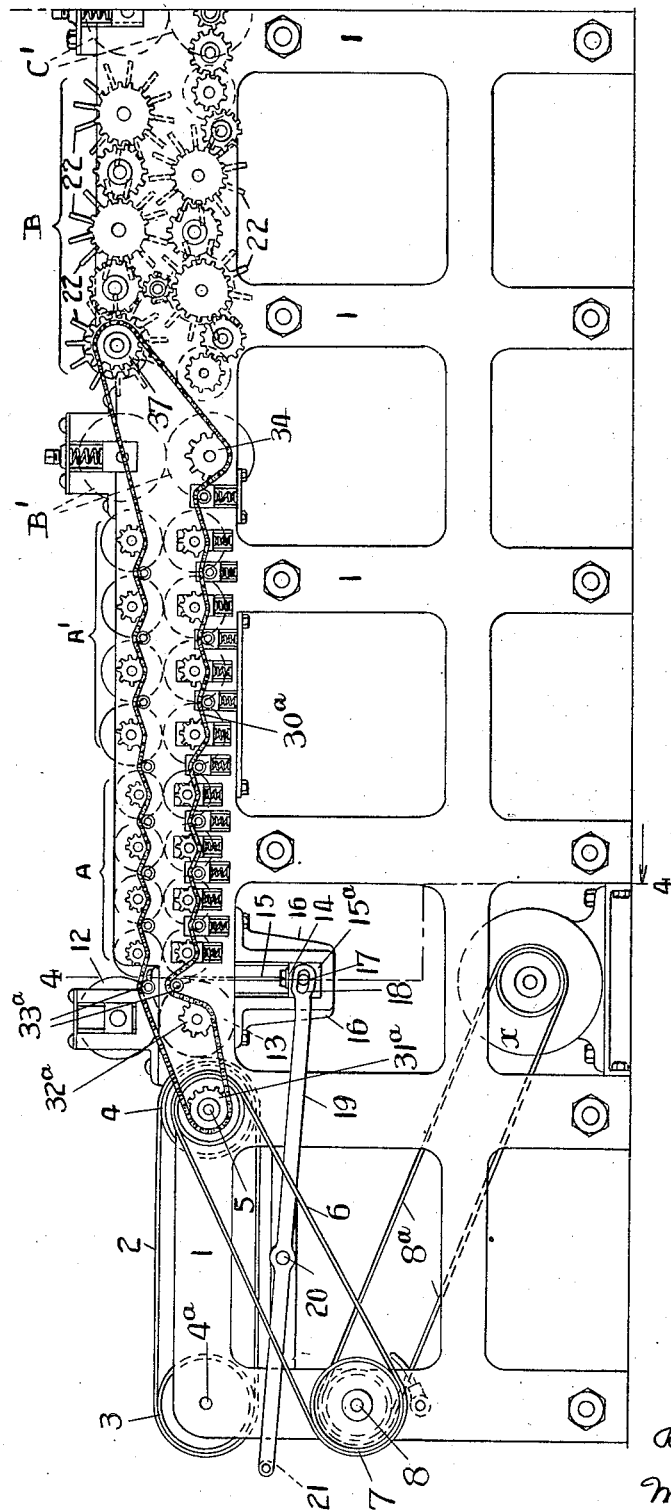

Motion is transmitted to the above mentioned rollers $d$ and 28 from pinions 40, mounted upon the spindles of the above mentioned fluted roller 22, and the finely fluted roller 26, through idler pinions 41 carried upon the arms 38 as shown in Fig. 2$^b$, and which idler pinions in turn engage and drive other pinions 41$^a$ secured upon the spindles of the said rollers $d$ and 26.

With the arrangement shown in Figs. 6, 7 and 8 the operation of the rollers 13 and 30 may be effected through a train of gearing from the shaft of the roller 4, the chain 30$^a$ receiving motion from a chain wheel 42 mounted upon a stud 43 driven from a pinion 44 upon the last lower roller 30 through an idler 45.

Claims.

1. Apparatus for separating fibers from bast plants or other adhering fibers comprising vertically disposed pairs of rollers, the lower roller of each pair being spring mounted whereby it is adapted to exert a pressure against the upper roller, a plurality of zones of deeply fluted rollers, said deeply fluted rollers being so arranged that the ribs of one lower roller mesh with the ribs of two upper rollers and are spaced from the sides and bottom of the flutes so that the material passing between them is not compressed, and a pair of substantially smooth rollers preceding and forming part of each zone, and means for removing extraneous substances from the separated fibers after they leave said zones, and means for rotating said rollers and actuating said means.

2. Apparatus for separating fibers from bast plants or other adhering fibers comprising vertically disposed pairs of rollers, the lower roller of each pair being spring mounted whereby it is adapted to exert a pressure against the upper roller, a plurality of zones of deeply fluted rollers, said deeply fluted rollers being so arranged that the ribs of one lower roller mesh with the ribs of two upper rollers and are spaced from the sides and bottom of the flutes so that material passing between them is not compressed, and a pair of substantially smooth rollers preceding and forming part of each zone, and means for removing extraneous substances from the separated fibers after they leave said zones, means preceding the zones for removing the seeds prior to the entry of the material into said zones.

3. Apparatus for separating fibers from bast plants or other adhering fibers comprising vertically disposed pairs of rollers, the lower roller of each pair being spring mounted whereby it is adapted to exert a pressure against the upper roller, a plurality of zones of deeply fluted rollers, said deeply fluted rollers being so arranged that the ribs of one lower roller mesh with the ribs of two upper rollers and are spaced from the sides and bottom of the flutes so that material passing between them is not compressed, and a pair of substantially smooth rollers preceding and forming part of each zone, and means for removing extraneous substances from the separated fibers after they leave said zones, means preceding the zones for removing the seeds prior to the entry of the material into said zones comprising a lower roller positively driven and supported in fixed bearings, an upper roller of larger diameter and greater weight than the lower roller and mounted as to be capable of movement in the vertical plane, a horizontally disposed bar arranged transversely of the line of movement of the material, upwardly projecting pins having dull points disposed upon the upper surface of said bar and means for raising and lowering said bar to cause the pins to pass up between the material and between which the material afterward passes, and rollers for drawing the material between said pins.

4. Apparatus for separating fibers from bast plants or other adhering fibers comprising vertically disposed pairs of rollers, the lower roller of each pair being spring mounted whereby it is adapted to exert a pressure against the upper roller, a plurality of zones of deeply fluted rollers, said deeply fluted rollers being so arranged that the ribs of one lower roller mesh with the ribs of two upper rollers and are spaced from the sides and bottom of the flutes so that material passing between them is not compressed, and a pair of substantially smooth rollers preceding and forming part of each zone means for securing the alignment of the material at a right angle to the longitudinal axes of the rollers, and means for removing extraneous substances from the separated fibers after they leave said zones.

5. In Apparatus for separating fibers from bast plants and other adhering fibers, means for drawing the material and compressing the stalks, comprising vertically disposed pairs of rollers arranged in groups the lower roller of each pair being spring mounted whereby it is adapted to exert a pressure against the upper roller, the diameters of the rollers being the same for the rollers of a group, the diameters of the rollers of a succeeding group being increased, and means for rotating said rollers.

6. Apparatus for separating fibers from bast plants and other adhering fibers comprising a plurality of pairs of smooth rollers alternating with groups of fluted rollers, the fluted rollers being arranged with the upper rollers in staggered relationship to the lower rollers so that the ribs of one lower roller mesh with the ribs of two upper rollers, the number of upper rollers in each zone being one in excess of the lower rollers, and means for rotating all of said rollers.

7. Apparatus for separating fibers from bast plants and other adhering fibers including a plurality of pairs of smooth rollers alternating with groups of fluted rollers, the fluted rollers being arranged with the upper rollers in staggered relationship to the lower rollers so that the ribs of one lower roller mesh with the ribs of two upper rollers, the number of upper rollers in each zone being one in excess of the lower rollers, single smooth rollers, one arranged before and after the first and last lower fluted rollers in each zone, and means for rotating all of said rollers.

8. Apparatus for separating fibers from bast plants and other adhering fibers including a plurality of pairs of smooth rollers alternating with groups of fluted rollers the fluted rollers being arranged with the upper rollers in staggered relationship to the lower rollers so that the ribs of one lower roller mesh with the ribs of two upper rollers, the number of upper rollers in each zone being one in excess of the lower rollers, and the fluted rollers being so constructed and arranged that the depth to which the ribs of a succeeding lower roller in a zone mesh with the ribs of the two upper rollers is greater than that of the preceding lower roller, and means for rotating all of said rollers.

9. Apparatus for separating fibers from bast plants and other adhering fibers including a plurality of zones of rollers comprising a plurality of deeply fluted rollers mounted on fixed bearings, the upper rollers being arranged in staggered relationship to the lower, so that the ribs of one lower roller mesh with the ribs of two upper rollers, the number of upper rollers in each zone being one in excess of the lower rollers, and the rollers being so constructed and arranged that the depth to which the ribs of a succeeding lower roller in a zone mesh with the ribs of the two upper rollers is greater than that of the preceding lower roller, single smooth rollers, one arranged before and after the first and last lower fluted rollers in each zone, pairs of smooth rollers, of which one is rigidly and the other resiliently mounted, preceding each zone of fluted rollers, and means for rotating all of said rollers.

10. Apparatus for separating fibers from bast plants and other adhering fibers including zones of intermeshing fluting rollers, a pair of substantially smooth rollers preceding and forming part of each zone, and means for rotating all of said rollers whereby the carrying speed of all the fluted rollers is the same, the carrying speed of the pair of smooth rollers preceding the zone of fluted rollers being slightly reduced with respect to the carying speed of the fluted rollers of said zone.

11. Apparatus for separating fibers from bast plants and other adhering fibers including zones of intermeshing fluted rollers of varying diameters, a pair of substantially smooth rollers preceding and forming part of each zone, and means for rotating all of said rollers at speeds varying with the diameter thereof so that the carrying speed of all the fluted rollers is the same, the carrying speed of the pair of smooth rollers preceding the zone of fluted rollers being slightly reduced with respect to the carrying speed of the fluted rollers of said zone.

12. Apparatus for separating fibers from bast plants and other adhering fibers including zones of intermeshing fluted rollers, the upper rollers being arranged in staggered relationship to the lower rollers and the number of upper rollers in each zone being one in excess of the lower rollers, single smooth rollers, one arranged before and after the first and last lower fluted rollers in each zone, and means for rotating all of said rollers, the single rollers being rotated at a greater speed than the fluted rollers.

13. In apparatus for separating fibers from bast plants comprising a series of rollers, means for effecting the alignment of the material at a right angle to the axes of the rollers, consisting of a plurality of pairs of rollers of which the first pair are feeding rollers with the upper under spring pressure and the succeeding rollers having pins projecting therefrom, the pins on an upper roller being interspaced with the pins on a lower roller and meshing with pins on rollers preceding and succeeding on the same plane and means for rotating each succeeding pair of said rollers at a higher speed than the preceding pair.

14. In apparatus for separating fibers from bast plants including a series of rollers, means for removing seeds from the plants and effecting the alignment of the material at a right angle to the axes of the rollers, consisting of a moving feed band, a pair of smooth rollers, one of which is resiliently mounted, a plurality of pairs of rollers, pins projecting therefrom, the pins on an upper roller being interspaced with the pins in a lower roller, and means for rotating each succeeding pair of said rollers at a higher speed than the preceding pair.

15. In apparatus for separating fibers from bast plants and other adhering fibers, means for removing extraneous material from the separated fibers comprising several pairs of smooth rollers adapted to press resiliently against one another, a plurality of pairs of rollers all rigidly mounted, the upper roller of each pair having radially projecting pins, rollers adapted to press resiliently against one another from below upwards to grip the material as it emerges from between the upper pinned rollers, means for rotating all of said rollers, and means for changing the direction of rotation of the pinned rollers when desired.

16. In apparatus for separating fibers from bast plants and other adhering fibers, means for removing extraneous material from the separated fibers comprising pairs of smooth rollers, the lower being journalled in fixed and the other in resilient bearings, a plurality of pairs of rollers all rigidly mounted, the lower rollers being smooth, radially projecting pins upon the upper rollers, pairs of finely fluted or roughened rollers of which the upper is supported by fixed bearings and the lower is resiliently mounted, a pair of smooth rollers of which the upper is resiliently mounted and the lower is rigidly mounted, means for rotating all of said rollers and means for changing the direction of rotation of the pinned upper rollers succeeding the deeply fluted staggered rollers when desired.

In testimony whereof I have hereunto set my hand.

REUBEN LEVI PRITCHARD.